No. 772,011. PATENTED OCT. 11, 1904.
G. A. WEBER.
INSULATED RAIL JOINT.
APPLICATION FILED NOV. 24, 1903.
NO MODEL. 6 SHEETS—SHEET 1.
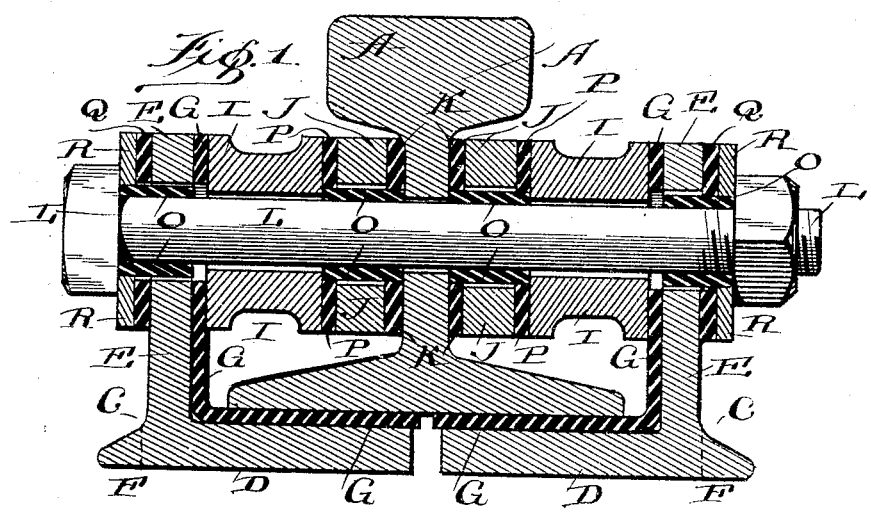
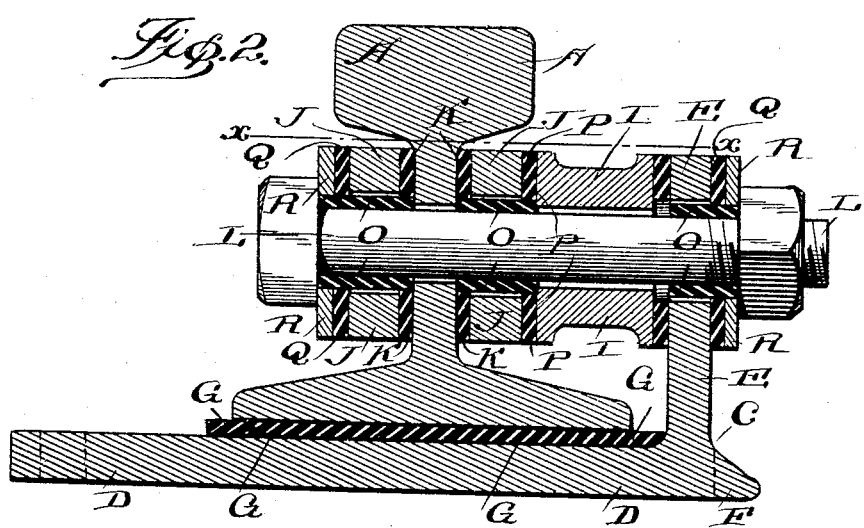
Witnesses
George A. Weber
Inventor No. 772,011. PATENTED OCT. 11, 1904.
G. A. WEBER.
INSULATED RAIL JOINT.
APPLICATION FILED NOV. 24, 1903.
NO MODEL. 6 SHEETS—SHEET 2.
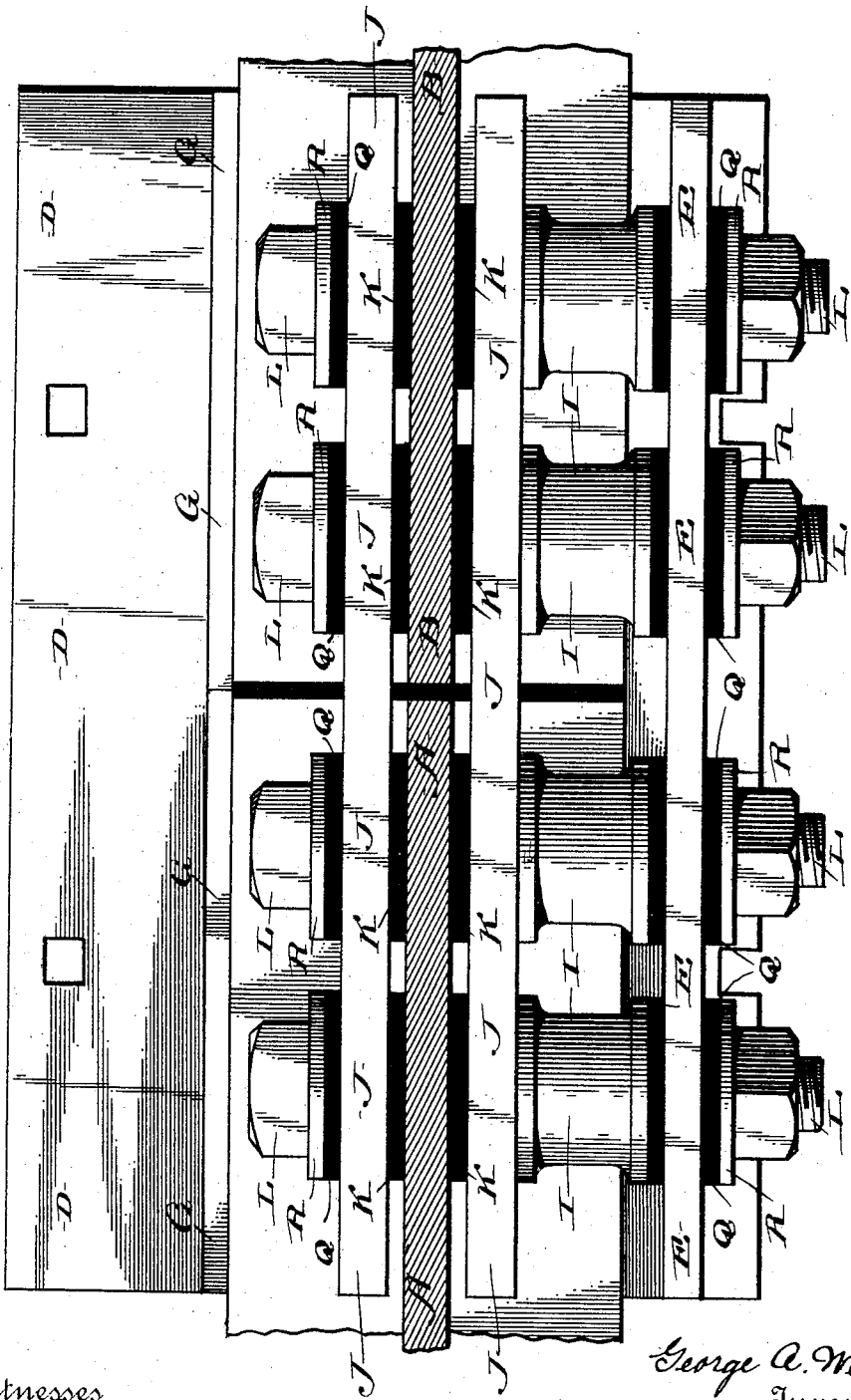

No. 772,011. PATENTED OCT. 11, 1904.
G. A. WEBER.
INSULATED RAIL JOINT.
APPLICATION FILED NOV. 24, 1903.
NO MODEL. 6 SHEETS—SHEET 3.
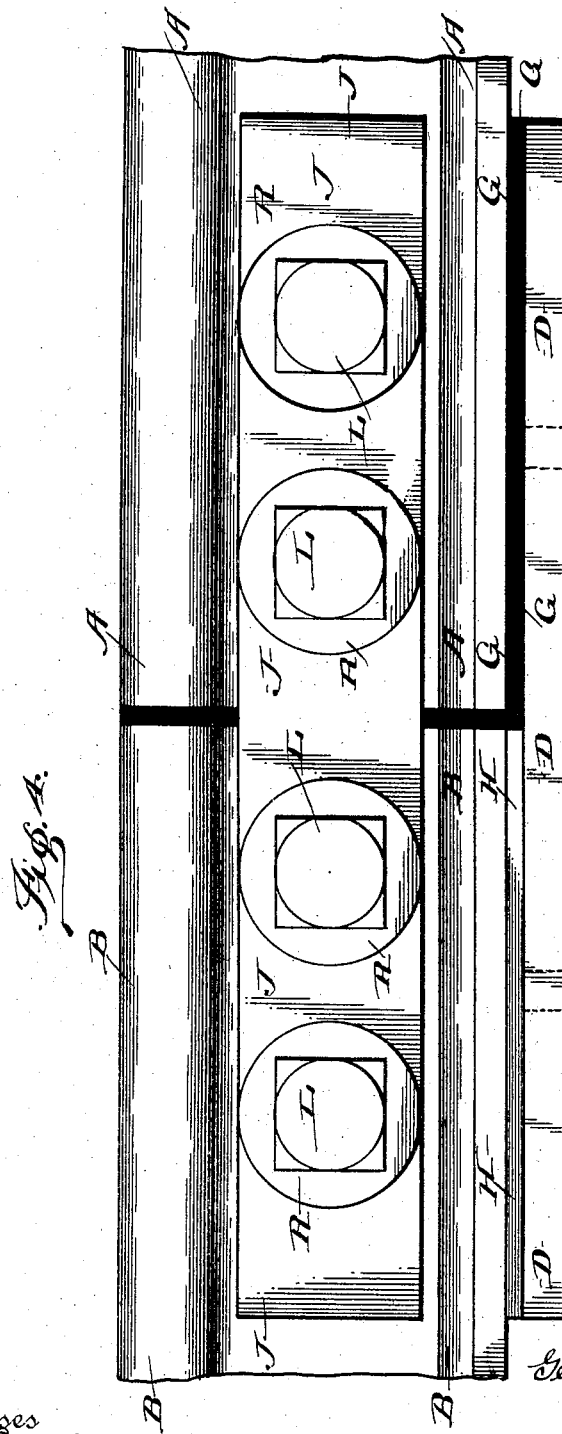

No. 772,011. PATENTED OCT. 11, 1904.
G. A. WEBER.
INSULATED RAIL JOINT.
APPLICATION FILED NOV. 24, 1903.
NO MODEL. 6 SHEETS—SHEET 4.
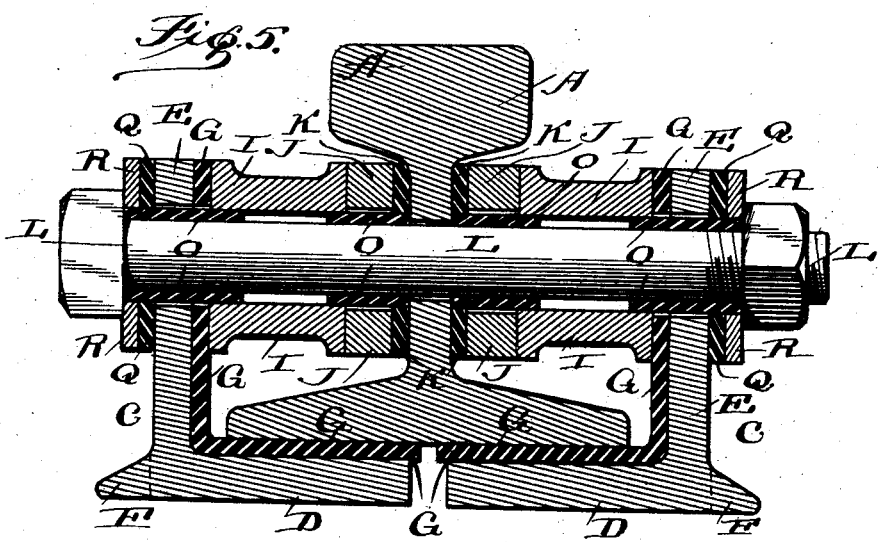

No. 772,011. PATENTED OCT. 11, 1904.
G. A. WEBER.
INSULATED RAIL JOINT.
APPLICATION FILED NOV. 24, 1903.
NO MODEL. 6 SHEETS—SHEET 5.
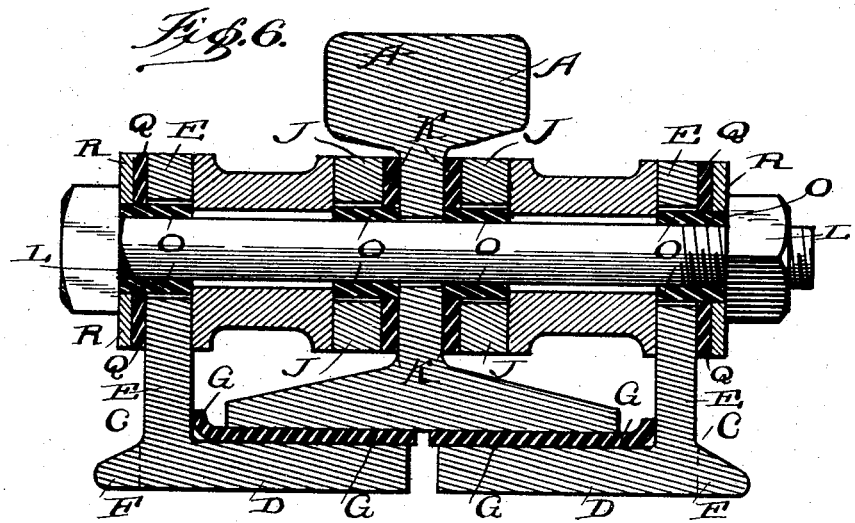
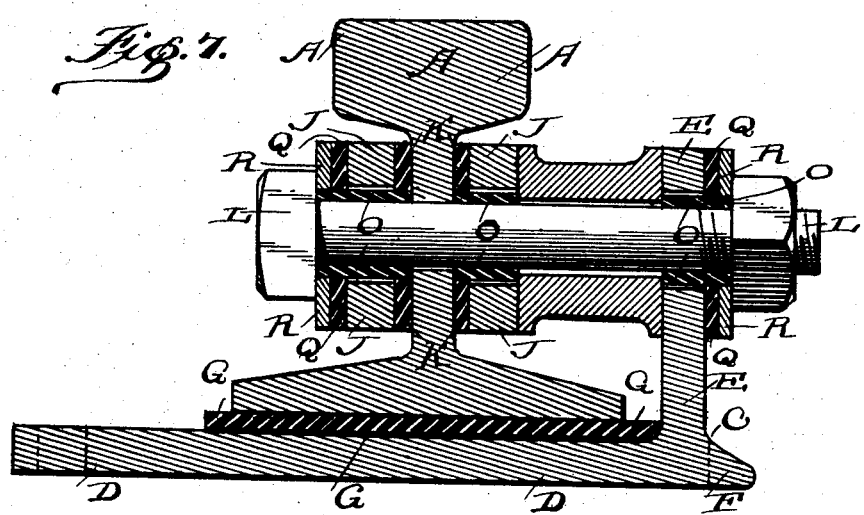

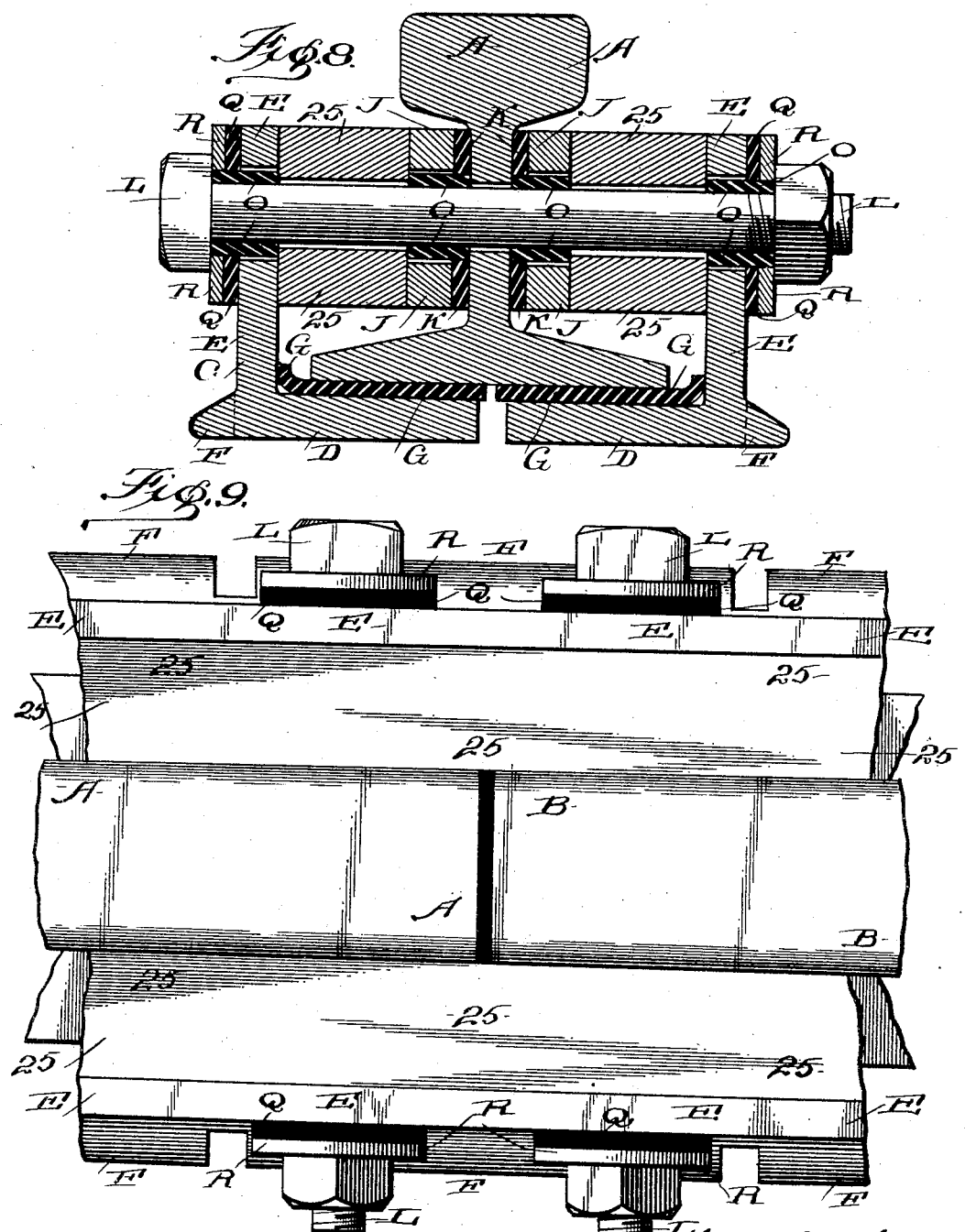

No. 772,011. Patented October 11, 1904.

UNITED STATES PATENT OFFICE.

GEORGE A. WEBER, OF NEW YORK, N. Y., ASSIGNOR TO WEBER RAILWAY JOINT MANUFACTURING COMPANY, OF NEW YORK, N. Y., A CORPORATION OF WEST VIRGINIA.

INSULATED RAIL-JOINT.

SPECIFICATION forming part of Letters Patent No. 772,011, dated October 11, 1904.

Application filed November 24, 1903. Serial No. 182,514. (No model.)

*To all whom it may concern:*

Be it known that I, GEORGE A. WEBER, a citizen of the United States, and a resident of the borough of Manhattan, city, county, and State of New York, have invented certain new and useful Improvements in Insulated Rail-Joints, of which the following is a specification accompanied by drawings.

This invention relates to rail-joints, but more particularly to that class known as "insulated" joints, having suitable insulation provided for insulating one rail from the other.

The objects of this invention are to improve upon the construction of such joints and simplify them, while at the same time affording high efficiency of insulation.

Further objects of the invention will hereinafter appear; and to these ends the invention consists of an insulated joint for carrying out the above objects embodying the features of construction, combinations of elements, and arrangement of parts substantially as hereinafter fully described and claimed in this specification and shown in the accompanying drawings, in which—

Figure 1 is a transverse sectional view of an insulated joint embodying the invention, with two rail-chairs. Fig. 2 is a transverse sectional view of a joint having one rail-chair. Fig. 3 is a sectional plan view of Fig. 2 on the line 3 3, showing insulating-washers between the metallic filling-pieces and the uprights of the chair. Fig. 4 is a longitudinal sectional view showing insulation under one of the rails only. Fig. 5 is a tranverse side view of a joint having one rail-chair and showing a different mode of insulating the metallic filling-pieces. Figs. 6 and 7 are sectional views showing joints having filling-pieces of insulation material, as wood. Fig. 8 is a sectional view showing filling-pieces in the form of insulating-straps, as of wood. Fig. 9 is a plan view of Fig. 8.

Referring to the drawings, A and B represent the meeting ends of rails, and C represents rail-chairs, each having a base D, an upright E, and a spiking rib or fillet F. The base of at least one of the rails is insulated from the chairs by suitable insulation G, which may extend upward along the inside faces of the uprights of the chairs. In Fig. 4 the insulation G is shown beneath the base of one rail, while the other rail is supported upon a block H. Between the webs of the rails and the uprights of the chairs are shown filling-pieces I of any suitable material, as metal, or insulation, as wood, in this instance they being shown of metal in the form of spools suitably insulated from the uprights of the chairs by the insulation G.

Extending along the webs of the rails and across the joint are bands, bars, or straps J, of metal, insulated from the webs of the rails by insulating-washers K at each bolt L. The bolts L are insulated from the bars J and from the uprights of the chairs by insulating-sleeves O. Between the bars J and metallic filling-pieces I are inserted insulating-washers P, while insulating-washers Q are inserted between the uprights of the chairs and the metallic washers R and nuts S of the bolts. At the other side of the joint opposite the upright of the chair the bar or band J is insulated from the heads of the bolts and metallic washers R by the insulating-washers Q. Since the uprights of the chairs and the bars J are both insulated from the bolts and from the rails, it is not necessary that the metallic filling-pieces I be insulated from the uprights and the bars; but they may be in actual contact therewith, as shown in Fig. 5, wherein a simpler mode of insulation is shown. In this instance the insulating-sleeves O are extended sufficiently along the bolts to maintain the filling-pieces out of contact with the said bolts, and it will be seen that said filling-pieces abut directly against the bars J and uprights of the chairs.

In the form of joint shown in Figs. 2 and 5 insulating-washers K are arranged between the bars J and webs of the rails to insulate the bars from the rails, and it is obvious that different features of the invention may be used alone or in different combinations. Therefore the invention is not to be understood as limited to the construction shown and described.

In Figs. 6 and 7 the filling-pieces are shown of insulating material, as of wood, and the insulation from the rails and chairs is not needed.

In Fig. 8 the filling-pieces are shown in the form of continuous insulating-straps 25, of suitable material, as wood.

The invention may be embodied in widely-varying forms.

Therefore, without enumerating equivalents, I claim, and desire to obtain by Letters Patent, the following:

1. An insulated rail-joint, comprising the meeting ends of rails, a rail-chair at each side of the joint, metallic bars or straps at each side of the webs of the rails and insulated therefrom by insulating-washers arranged between the straps and the rail-webs, metallic filling-pieces between said straps and the uprights of the chairs, bolts for securing the parts of the joint together, and suitable insulation for insulating one rail from the other, for substantially the purposes set forth.

2. An insulated rail-joint, comprising the meeting ends of rails, a rail-chair at each side of the joint, metallic bars or straps arranged adjacent the webs of the rails at each side and insulated therefrom by insulating-washers arranged between the straps and the rail-webs, metallic filling-pieces arranged between the straps and uprights of the chairs and in contact with said straps and uprights, bolts for securing the parts of the joint together, and suitable insulation for insulating one rail from the other, for substantially the purposes set forth.

3. An insulated rail-joint, comprising the meeting ends of rails and a rail-chair, metallic bars or straps at each side of the webs of the rails and insulated therefrom by insulating-washers arranged between the straps and the rail-webs, metallic filling-pieces between the bar on one side of the joint and the upright of the chair, bolts for securing the parts of the joint together, and suitable insulation for insulating one rail from the other, for substantially the purposes set forth.

4. An insulated rail-joint, comprising the meeting ends of rails and a rail-chair, metallic bars or straps at each side of the webs of the rails and insulated therefrom by insulating-washers arranged between the straps and the rail-webs, metallic filling-pieces between the bar on one side of the joint and the upright of the chair, said filling-pieces being in contact with said bar and upright, bolts for securing the parts of the joint together, and suitable insulation for insulating one rail from the other, for substantially the purposes set forth.

5. An insulated rail-joint, comprising the meeting ends of rails and a rail-chair, insulation beneath the base of one of the rails, said chair being stepped to support the other rail in surface, metallic bars or straps at each side of the joint, metallic filling-pieces between one of the bars and the upright of the chair, bolts for securing the parts of the joint together, and means for insulating one rail from the other, for substantially the purposes set forth.

In testimony whereof I have signed this specification in the presence of two subscribing witnesses.

GEORGE A. WEBER.

Witnesses:
E. VAN ZANDT,
A. L. O'BRIEN.